United States Patent
Kitou et al.

(10) Patent No.: US 10,235,448 B2
(45) Date of Patent: Mar. 19, 2019

(54) DATA PROCESSING SUPPORTING METHOD, DATA PROCESSING SERVER, AND PROGRAM

(71) Applicant: HITACHI, LTD., Tokyo (JP)

(72) Inventors: Daisuke Kitou, Tokyo (JP); Satoshi Yashiro, Tokyo (JP); Kei Kitahara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 344 days.

(21) Appl. No.: 15/076,925

(22) Filed: Mar. 22, 2016

(65) Prior Publication Data

US 2016/0321329 A1    Nov. 3, 2016

(30) Foreign Application Priority Data

Apr. 28, 2015 (JP) .................................. 2015-090998

(51) Int. Cl.
*G06F 7/00* (2006.01)
*G06F 17/30* (2006.01)

(52) U.S. Cl.
CPC .. *G06F 17/30663* (2013.01); *G06F 17/30241* (2013.01)

(58) Field of Classification Search
None
See application file for complete search history.

(56) References Cited

U.S. PATENT DOCUMENTS

| | | | |
|---|---|---|---|
| 2005/0270311 A1* | 12/2005 | Rasmussen | G01C 21/32 345/677 |
| 2008/0288474 A1 | 11/2008 | Chin et al. | |
| 2010/0325610 A1 | 12/2010 | Matsui | |
| 2013/0332314 A1 | 12/2013 | Takeda | |
| 2013/0345975 A1* | 12/2013 | Vulcano | G01C 21/3632 701/533 |

FOREIGN PATENT DOCUMENTS

| | | |
|---|---|---|
| JP | 2007-531004 A | 11/2007 |
| JP | 2010-527494 A | 8/2010 |
| JP | 5426938 B2 | 12/2013 |
| WO | 2013/080329 A1 | 6/2013 |

* cited by examiner

*Primary Examiner* — Tuan A Pham
(74) *Attorney, Agent, or Firm* — Volpe and Koening, P.C.

(57) ABSTRACT

A search string including a location name is received from a client terminal, the search string is broken down, related data of each broken down (BD) information is acquired from a website, each BD information and its related data are stored in a storage unit in association with each other. For each BD information, it is determined whether a record of the related data includes a plurality of pieces of latitude/longitude information. A mesh display flag or a pin display flag is set to the BD information in the storage unit based on a result of the determination. Polygon display processing, mesh display processing, or pin display processing on a map is executed on the related data of the BD information based on a value of the mesh display flag and a value of the pin display flag, and a result of the processing is transmitted to the client terminal.

6 Claims, 12 Drawing Sheets

Fig.2

DATA PORTAL REGISTRATION INFORMATION 112

| # | DATA PORTAL SITE | URL | LOCATION NAME/ GROUP | LANGUAGE |
|---|---|---|---|---|
| 1 | YOKOHAMA CITY DATA PORTAL | http://www.yokohama.opendata.xx | YOKOHAMA CITY | JP |
| 2 | KYOTO CITY DATA PORTAL | http://www.kyoto.opendata.xx | KYOTO CITY | JP |
| 3 | CHICAGO DATA PORTAL | http://data.chicago.xx | CHICAGO | EN |
| 4 | A MINISTRY DATA PORTAL | http://www.data.government.xx | GOVERNMENT | JP |
| ... | ... | ... | | |

Fig.3

BROKEN DOWN SEARCH STRING INFORMATION TABLE 113

310

| # | BROKEN DOWN SEARCH STRING INFORMATION | MAIN/ ATTRIBUTE FLAG | FILE | COLUMN | LOCATION INFORMATION TYPE | LOCATION INFORMATION | ATTRIBUTE ID | RELATED ATTRIBUTE |
|---|---|---|---|---|---|---|---|---|
| 1 | TRAFFIC ACCIDENT AND | MAIN | a1.csv | TRAFFIC ACCIDENT | 1 | LATITUDE, LONGITUDE | - | - |
| 2 | ELEMENTARY SCHOOL | MAIN | a2.csv | ELEMENTARY SCHOOL | 3 | ADDRESS | - | - |

320

| # | BROKEN DOWN SEARCH STRING INFORMATION | MAIN/ ATTRIBUTE FLAG | FILE | COLUMN | LOCATION INFORMATION TYPE | LOCATION INFORMATION | ATTRIBUTE ID | RELATED ATTRIBUTE |
|---|---|---|---|---|---|---|---|---|
| 1 | HIGH-RANKING | ATTRIBUTE | b1.csv | RANKING | - | - | 1 | - |
| 2 | ELEMENTARY SCHOOL | MAIN | b1.csv | ELEMENTARY SCHOOL | 3 | ADDRESS | - | 1 |

Fig.4

DISPLAY FORMAT FLAG INFORMATION 114

(a)

| # | BROKEN DOWN SEARCH STRING INFORMATION | PIN (DATA) | MESH (DATA) |
|---|---|---|---|
| 1 | TRAFFIC ACCIDENT AND | 1 | |
| 2 | ELEMENTARY SCHOOL | 1 | |

↗401 ↗402 ↗403 ↗410

(b)

↗401 ↗402 ↗403 ↗404 ↗405 ↗406 ↗420

| # | BROKEN DOWN SEARCH STRING INFORMATION | PIN (DATA) | MESH (DATA) | PIN (SEARCH STRING) | MESH (SEARCH STRING) | ATTRIBUTE PIN |
|---|---|---|---|---|---|---|
| 1 | HIGH-RANKING | | | | | 1 |
| 2 | ELEMENTARY SCHOOL | 1 | | 1 | | |

↗430

| # | BROKEN DOWN SEARCH STRING INFORMATION | PIN (DATA) | MESH (DATA) | PIN (SEARCH STRING) | MESH (SEARCH STRING) | ATTRIBUTE PIN |
|---|---|---|---|---|---|---|
| 1 | POPULATION DENSITY AND | 1 | | | 0 | |
| 2 | ELEMENTARY SCHOOL | 1 | | 1 | | |

↗440

| # | BROKEN DOWN SEARCH STRING INFORMATION | PIN (DATA) | MESH (DATA) | PIN (SEARCH STRING) | MESH (SEARCH STRING) | ATTRIBUTE PIN |
|---|---|---|---|---|---|---|
| 1 | WITH FEW CRIMES | | 1 | | 2 | |
| 2 | ELEMENTARY SCHOOL | 1 | | 1 | | |

Fig.5

ROUTINE PROCESSING FILE IDENTIFYING INFORMATION 115

| # | FILE TYPE | ROUTINE PROCESSING CONTENT | PROCESSING COMPONENT ID |
|---|---|---|---|
| 1 | kml | DIRECTLY DISPLAY | - |
| 2 | shape | CONVERT TO kml AND DISPLAY | 001 |

PROCESSING COMPONENT NAME

Fig.6

PROCESSING COMPONENT INFORMATION 116

| # | PROCESSING COMPONENT NAME | PROCESSING COMPONENT ID | CONFIGURATION PROGRAM NAME |
|---|---|---|---|
| 1 | Shape_to_Kml | 001 | C:¥Program/comp1.jar |
| 2 | CreatePIN | 002 | C:¥Program/comp2.js |
| 3 | CreateMesh | 003 | C:¥Program/comp3.js |
| 4 | ChangeColor type1 | 004 | C:¥Program/comp4.js |
| 5 | CreatePoly | 005 | C:¥Program/comp5.js |
| 6 | GetFile | 006 | C:¥Program/comp6.jar |
| 7 | CreateMap | 007 | C:¥Program/comp7.js |
| 8 | AddAttribute | 008 | C:¥Program/comp8.js |
| 9 | ChangePIN | 009 | C:¥Program/comp9.js |
| 10 | ChangePINColor1 | 010 | C:¥Program/comp10.js |

Fig.10

NUMERICAL VALUE RELATED TERM TABLE 118

| # | TERM | MAGNITUDE FLAG |
|---|---|---|
| 1 | POPULATION DENSITY | 0 |
| 2 | BIRTH RATE | 0 |
| 3 | ** RATE | 0 |
| 4 | DENSITY | 0 |
| 5 | LARGE AMOUNT | 1 |
| 6 | SMALL AMOUNT | 2 |
| 7 | LARGE | 1 |
| 8 | HIGH | 1 |

1001 (TERM column), 1002 (MAGNITUDE FLAG column)

DATA PROCESSING SUPPORTING METHOD, DATA PROCESSING SERVER, AND PROGRAM

CROSS-REFERENCE TO PRIOR APPLICATION

This application relates to and claims the benefit of priority from Japanese Patent Application number 2015-090998, filed on Apr. 28, 2015, the entire disclosure of which is incorporated herein by reference.

BACKGROUND

The present invention relates to a data processing supporting method, a data processing server, and a program that acquire search string related data from a website and support processing of the acquired search string related data.

Today, a huge amount of data is produced by companies and societies everyday and attempts have been vigorously made to collect and analyze the huge amount of data to obtain new findings and values therefrom. For example, an attempt has been made to support abnormal detection from a huge amount of operation records of devices and to support management decision making based on huge amounts of client information, sales performances, and the like. Recently, environments for using not only privately owned data such as that of companies, but also data owned by public institutions such as governments and municipalities have been under preparation. The public institutions have started to provide portal sites (websites) with which data in their property is made open to the public as open data to be widely used by the public. This approach is expected to lead to creation of new services and economic revitalization from the private sector using the open data. These pieces of data can be used as raw data, and can also be provided with an additional value through processing such as combining with another data, editing, and the like. For example, data related to weather such as temperature and an amount of precipitation, published by a public institution, may be combined with data related to a state of crops, owned by a farmer, to facilitate an attempt to predict an amount of harvested crops, for example.

The data processing requires various types of processing to be performed in accordance with a type of the data used and a content of processing desired by the user. Thus, it is difficult for a user with limited knowledge and skill on data processing to determine the processing to be executed. In view of this situation, a technique is available in which executable processing is defined in advance, so that the user can easily perform the desired processing by reusing or combining such executable processing (Japanese Patent No. 5426938). In Japanese Patent No. 5426938, processing components, defined in advance, are combined to each other to define a flow of processing that is desired by the user to be executed. When the user selects a processing component to be used first, candidates of processing components that can be combined next are proposed. The desired processing is executed with this procedure repeated.

SUMMARY

Unfortunately, the conventional technique still requires the user to determine which one of multiple processing components that can be combined should be selected, and thus to have knowledge for the determination. Furthermore, a cumbersome procedure of combining the processing components one by one is required. Moreover, the procedure, in which selection of a processing component triggers displaying of the candidates of the next processing component that can be combined, makes it difficult for the user to determine when to stop combining the processing components.

In view of the above, an object of the present invention is to provide a data processing supporting method, a data processing server, and a program with which a user with limited knowledge and skill on the data processing can easily process data acquired from a website such as a portal site.

A representative example of the present invention is as follows. A data processing supporting method according to the present invention is executed by a data processing server and includes receiving a search string including a location name from a client terminal, breaking down the search string, acquiring related data of each broken down information from a website, storing the each broken down information and the related data of the broken down information in a storage unit in association with each other, determining, for each broken down information, whether a record of the related data of the broken down information includes a plurality of pieces of latitude/longitude information, setting a mesh display flag or a pin display flag to the broken down information in the storage unit, based on a result of the determination, executing, on the related data of the broken down information, polygon display processing, mesh display processing, or pin display processing on a map, based on a value of the mesh display flag and a value of the pin display flag, and transmitting a result of the processing to the client terminal.

With the present invention, a user with limited knowledge and skill on the data processing can easily process data acquired from a website such as a portal site.

BRIEF DESCRIPTION OF THE DRAWINGS

FIG. 2 is a diagram illustrating an example of data portal registration information 112 according to the first embodiment of the present invention;

FIG. 3 is a diagram illustrating an example of a broken down search string information table 113 according to the first embodiment of the present invention;

FIG. 4 is a diagram illustrating an example of display format flag information 114 according to the first embodiment and a second embodiment of the present invention;

FIG. 5 is diagram illustrating an example of routine processing file identifying information 115 according to the first embodiment of the present invention;

FIG. 6 is a diagram illustrating an example of processing component information 116 according to the first embodiment of the present invention;

FIG. 10 is a diagram illustrating an example of a numerical value related term table 118 according to the second embodiment of the present invention;

DETAILED DESCRIPTION OF THE EMBODIMENTS

Embodiments of the present invention are described in detail below.

[First Embodiment]

Figure 1:
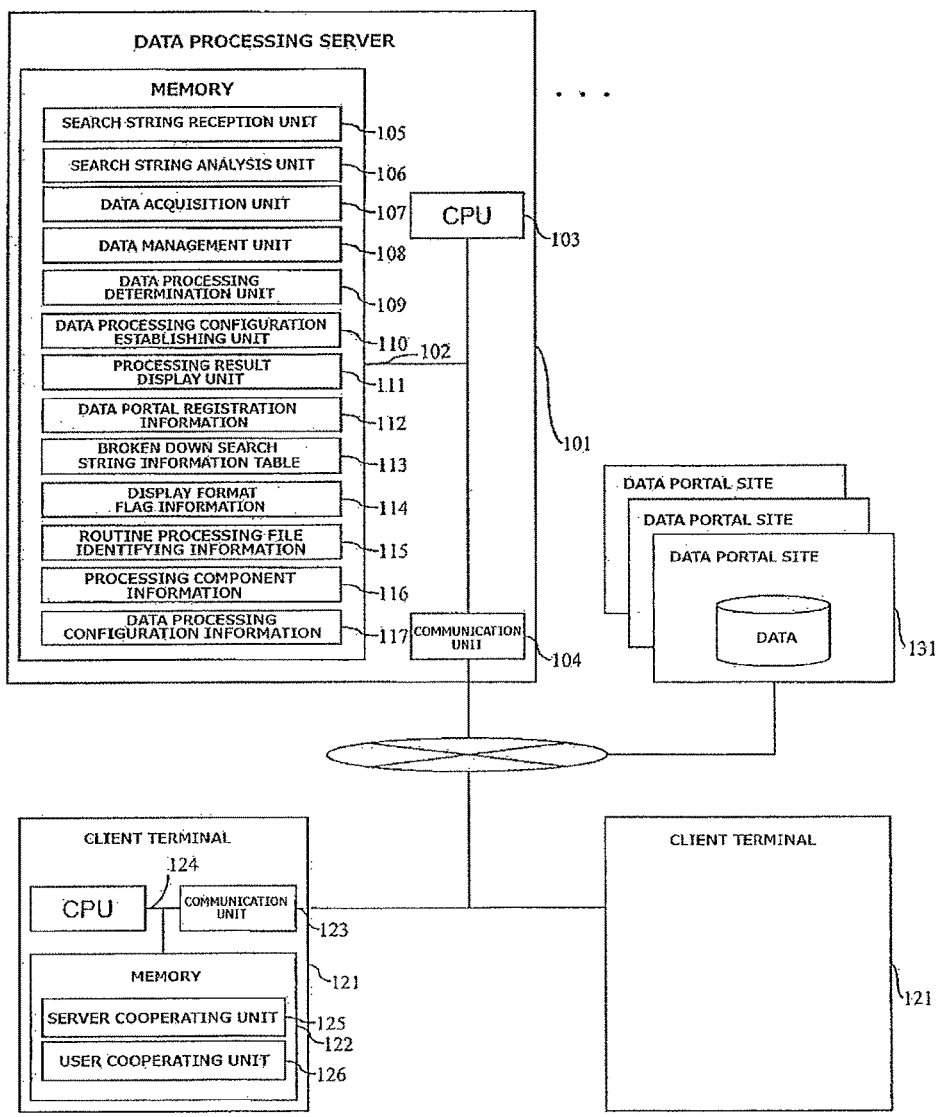
FIG. 1 is a block diagram illustrating an example of a hardware configuration and a software configuration of a data processing system according to a first embodiment of the present invention.

FIG. 1 is a block diagram illustrating hardware and software configurations of a data processing system according to a first embodiment of the present invention. The data processing system according to the first embodiment of the present invention is a computer system in which one or more data processing servers 101, one or more data portal sites 131, and one or more client terminals 121 are connected to a network. The data portal sites are websites with which various pieces of data are made available to the public and stored. General citizens and professional data processors, for example, can use the data for various purposes, including provision of a new service based on these pieces of data. Examples of the published data include: public data such as map information of the prefectures, and information on public institutions such as schools and public offices; results of uniquely processing the published data; and the like.

Each of the data processing servers 101 and the client terminals 121 are connected to the network respectively via communication units 104 and 123. The data processing server 101 performs reception of an operation request, transmission of an operation result as a response, and the like for an external device, such as the client terminal 121, via the communication unit 104.

The data processing server 101 may be implemented by a general computer including a CPU 103, a memory 102, the communication unit 104, and the like. The CPU 103 performs reception of the operation request from the external device, such as the client terminal 121, execution of the operation, transmission of a data processing result to the external device, and the like, via the communication unit 104. The memory 102 includes a search string reception unit 105, a search string analysis unit 106, a data acquisition unit 107, a data management unit 108, a data processing determination unit 109, a data processing configuration establishing unit 110, a processing result display unit 111, data portal registration information 112, a broken down search string information table 113, display format flag information 114, routine processing file identifying information 115, processing component information 116, and data processing configuration information 117. The memory 102, having the configuration described above, is coupled to the CPU 103 and the communication unit 104 through a coupling line such as a bus. The units (105 to 111), stored in the memory 102, can be implemented by a computer program. Although not elaborated in the figure, the units (105 to 111) and the pieces of information (112 to 117) may be stored in a storage device such as a hard disk, and may be loaded onto the memory 102 and executed by the CPU 103 as appropriate, for example.

The client terminal 121 can be implemented by a general computer including a CPU 124, a memory 122, a communication unit 123, and the like. The CPU 124 performs, for example, issuing of the operation request to the data processing server 101 and the like, reception of the operation result from the data processing server 101 and the like, via the communication unit 123. The memory 122 includes a server cooperating unit 125 and a user cooperating unit 126. The memory 122, having the configuration described above, is coupled to the CPU 124 and the communication unit 123 through a coupling line such as a bus.

Next, details (the memory 102 and information stored in the memory 122) of a software configuration of the data processing system according to the present embodiment will be described.

First of all, the pieces of information (112 to 117) other than a program stored in the memory 102 are described, and then pieces of program information (105 to 111) stored in the memory 102 will be described.

The data portal registration information 112 is address information of a data portal site, with which the data processing server 101 determines a data acquisition source.

FIG. 2 is a diagram illustrating an example of the data portal registration information 112 according to the first embodiment of the present invention. The data portal registration information 112 includes three data items that are items 201, 202, and 203. The item 201 indicates information on a data portal site name used for identifying a data portal site. The item 202 indicates uniform resource locator (URL) information of the data portal site. The item 203 indicates information on a location name or a group name (hereinafter, referred to as location name/group name) corresponding to the data portal site. An item 204 indicates information on a language used in each data portal site. For example, "JP" indicates that the portal site is a website in Japanese and "EN" indicates that the portal site is a website in English. The item 204 is used in a third embodiment. In FIG. 2, for example, "Yokohama city" is the location name/group name corresponding to a Yokohama city data portal site, and "government" is the location name/group name corresponding to a data portal site provided by an A ministry. This information is used by a user to designate a data acquisition source in data processing configuration establishing processing described later. For example, when information "Yokohama city" is designated, the data processing server 101 attempts to access the Yokohama city data portal site and acquire data. A plurality of pieces of information such as "Yokohama" and the like, other than "Yokohama city", may be registered as the location name/group name of each data portal site. Thus, the data processing server 101 similarly attempts to access the Yokohama city data portal site also when "Yokohama", other than "Yokohama city", is designated.

FIG. 3 is a diagram illustrating the broken down search string information table 113 according to the first embodiment of the present invention. The broken down search string information is information obtained by breaking down a search string, received from the user, into units such as nouns, and is used for managing pieces of broken down search string information obtained from a single search string. The broken down search string information table 113 includes eight data items that are items 301 to 308. The item 301 indicates each broken down search string information. For example, the item 301 indicates that a search string "traffic accident and elementary school", received from the user, is broken down into "traffic accident and" and "elementary school". The breaking down may be performed automatically by the data processing server 101 through a morphological analysis, based on dependency relation of postpositional particles in a search string, or may be performed by the user. The item 302 indicates whether the broken down search string information 301 is main or attribute information. For example, in the table 310, "traffic accident and" is main information meaning that this information is not attribute information for another information, and is information that exists independently. On the other hand, "high-ranking" is attribute information meaning that this information is attribute information (information that does not exist independently) for another information "elementary school". The item 303 indicates the name of a file acquired from a data portal site or the like, as data related to the broken down search string information 301. The item 304 is column name information indicating column name data in the file 303 to be used as data related to the broken down search string information 301. The item 305 indicates a location information type, and indicates how location information is included in the file 303. For example, a type "1" indicates that information on latitude and information on longitude are included as different columns as in a case of (latitude: 35.0), (longitude: 145.0). A type "2", not illustrated, indicates that information on latitude and information on longitude are included in a single column, as in a case of (latitude, longitude): (35.0,145.0). A type "3" indicates that the location information is included not in the form of latitude and longitude, but is included in the form of an address. The item 306 indicates the name of the column of the location information in the file 303. The item 307 indicates ID information for identifying attribute information. For example, in the table 320, "high-ranking" is an attribute for "elementary", and has an attribute ID "1". When the broken down search string information 301 includes a plurality of pieces of attribute information, each attribute is identified by using this attribute ID. The item 308 indicates whether there is related attribute information. For example, in the table 320, "elementary school" has a related attribute "high-ranking", and thus "1", which is the attribute ID of the related attribute, is stored in the item 308.

FIG. 4 is a diagram illustrating an example of the display format flag information 114 according to the first embodiment and a second embodiment of the present invention. The display format flag information is for managing information on a displayed format of acquired data corresponding to each broken down search string information 401. In the table 410, the display format flag information 114 includes three data items that are items 401 to 403. The item 401 indicates information obtained by breaking down a search string from the user, as in the case of the item 301. The item 402 is flag information indicating a result of determining whether the information corresponding to the item 401 is to be displayed in a pin format, from a data content. For example, when a value of the item 402 is "1", it is determined that the information is displayed in the pin format. The pin format is a format in which the information is displayed with a pin on a map, for example. The item 403 is flag information indicating a result of determining whether the information corresponding to the item 401 is to be displayed in a mesh format, from a data content. For example, when a value of the item 403 is "1", it is determined that the information is displayed in the mesh format. The mesh format is a format in which a map is partitioned into sections in a form of fine mesh, for example. A value related to each section of the mesh, indicating the number of schools in the section for example, is represented by a color shade of the section or the like.

FIG. 5 is a diagram illustrating an example of the routine processing file identifying information 115 according to the first embodiment of the present invention. The routine processing file identifying information is information for determining whether the acquired data is routine processing target data, and for identifying routine processing when the acquired data is determined to be routine processing target data. The routine processing file identifying information 115 includes three data items that are items 501 to 503. The item 501 indicates the type of a routine processing target file. In FIG. 5, for example, files in kml and shape formats are determined to be routine processing targets, and thus these files are each subjected to predetermined routine processing to be displayed on a map. The item 502 indicates a content of processing indicating details of the routine processing. For example, the shape file is subjected to processing of converting the shape file into a kml file to be displayed, or the other like processing. The item 503 indicates identifier information for a processing component corresponding to the routine processing indicated by the item 502. For example, the routine processing is executed on the shape file with a processing component with 001 as a processing component ID in the processing component information 116 described later.

FIG. 6 is a diagram illustrating an example of the processing component information 116 according to the first embodiment of the present invention. The processing component information is information for managing a processing component as a program component with which a specific function of the data processing server 101 (data processing, displaying of data on a map, and the like) can be executed. The processing component information 116 includes three data items that are items 601 to 603. The item 601 indicates the name of a processing component. The item 602 indicates ID information for identifying a processing component. The item 603 indicates information on a program configuring the processing component. Each processing component internally starts these programs to execute processing. A plurality of programs may be registered in the item 603, and thus the processing component may include the plurality of programs.

Figure 7:
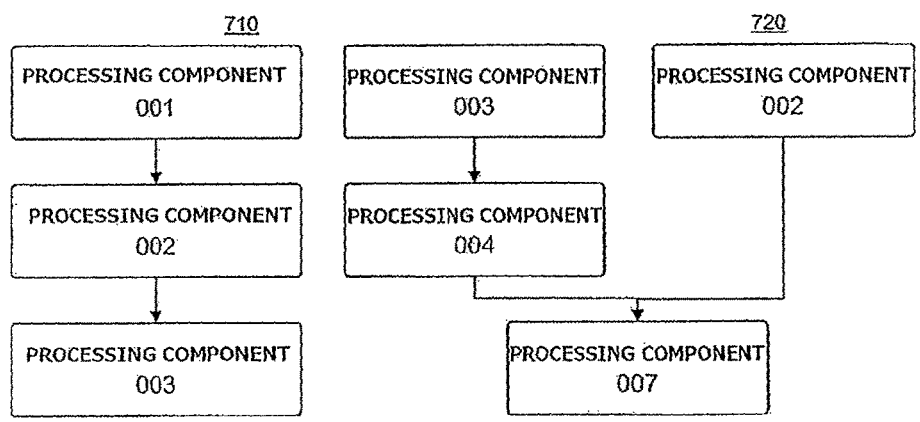
FIG. 7 is a diagram illustrating an example of data processing configuration information 117 according to the first embodiment of the present invention.

FIG. 7 is a diagram illustrating an example of data processing configuration information 117 according to the first embodiment of the present invention. FIG. 7A illustrates an example of a data processing configuration. FIG. 7B illustrates the data processing configuration information 117 in detail. The data processing configuration information is information indicating a flow of processing as well as data and a processing component used for the processing, and is configured with a combination of one or more processing components. For example, a data processing configuration 710 represents a processing configuration in which the processing components execute processing in series, and a data processing configuration 720 represents a processing configuration in which a processing component 007 executes processing with a result of processing, executed by processing components 003 to 004 and a processing component 002 in parallel, used as an input.

In FIG. 7B, the data processing configuration information 117 includes three data items that are items 701 to 703. The item 701 indicates ID information for identifying a data processing configuration. The item 702 indicates a combination of processing components forming a data processing configuration. For example, in FIG. 7, a content of a configuration of a pattern_01 indicates a processing configuration in which processing components 001, 002, and 003 are combined in series, and corresponds to the processing configuration 710. A content of a configuration of a pattern_02 indicates a configuration of processing in which the processing components 003 and 004 are combined in parallel with the processing component 002, and the processing component 007 receives and processes their output results, and corresponds to the data processing configuration 720. The item 703 indicates information on a file name to be input to a processing component. For example, when a file a1.csv is acquired as data related to certain broken down search string information and the processing component with 001 as the processing component ID executes processing with the file as an input, information 001:a1.csv is stored in the item 703.

Next, program information stored in the memory 102 will be described. The search string reception unit 105 receives a search string from the user through the client terminal 121. For example, when information on a traffic accident and an elementary school is visualized on a map, the user inputs a search string such as "traffic accident and elementary school", and transmits the search string to the data processing server 101 through the client terminal 121. The search string analysis unit 106 analyzes the search string received by the search string reception unit 105, and breaks down the search string into units such as a noun. For example, the search string "traffic accident and elementary school", received from the user, is broken down into "traffic accident and" and "elementary school", for example. The breaking down can be achieved with an algorithm such as a morphological analysis based on a dependency relation of postpositional particles in a sentence. Furthermore, an optional manual mode may be provided so that the user designates and performs breaking down of the search string described above. The search string analysis unit 106 also determines whether each search string information obtained by the breaking down is a main or an attribute information. For example, in a search string "goods in a shelter", it is determined that "shelter" is the main information and "goods" is the attribute information of "shelter", from a possessive relation indicated by "in". Furthermore, for example, in "school with a daycare", an attribute relationship ("daycare" is an attribute of "school") is determined based on a dependency relationship indicated by "having" or "with". The determination of the attribute relationship may be similarly set by the user in the manual mode described above, or the determination result obtained by the search string analysis unit 106 may be modified by the user. The data acquisition unit 107 acquires data, related to the search string received from the user, from an external data portal site or acquires the data in the server. For example, the data is acquired by accessing a website registered in the data portal registration information 112. The data management unit 108 manages registering, modifying, and the like of information (information 112 to 117) stored in the memory 102. The data processing determination unit 109 determines processing to be executed on the data, related to each search string information obtained by the breaking down, based on the content of the data and the content of the search string received from the user. For example, when the data, acquired by the data acquisition unit 107, is displayed on a map, whether pin creating processing or mesh creating processing is required is determined from the content of the data. When the data related to the search string received from the user is acquired and displayed on the map, the data processing configuration establishing unit 110 combines one or more data processing component, and thus establishes the data processing configuration as illustrated in FIG. 7, based on the result of determination of the data processing determination unit 109. The processing result display unit 111 displays a result of executing the data processing configuration, established by the data processing configuration establishing unit 110 from the search string received from the user, to the user through the client terminal 121. For example, a displayed content, such as that in which school information and traffic accident information are provided on the map in the pin format, the mesh format, or the like to be displayed. The processing result display unit 111 displays, based on a request from the client terminal 121, the data processing configuration, corresponding to the processing, as illustrated in FIG. 7.

Next, information stored in the memory 122 will be described. The server cooperating unit 125 cooperates with an external server, such as the data processing server 101, and performs transmission of an operation request (data input and function execution requests and the like), issued from the user through the client terminal 121, to the external server, reception of a response result from the external server, and the like. The user cooperating unit 126 receives the operation request to the client terminal 121 from the user, and executes processing of executing the operation requested by the user, displaying the operation result, and the like.

The hardware and the software configurations of the data processing system according to the present embodiment are as described above. Next, data processing configuration establishing processing according to the present embodiment is described, based on the hardware and the software configurations described above. The processing is executed when the user issues a request to execute the processing to the data processing server 101. The processing is described in detail below.

<Data Processing Configuration Establishing Processing>

Figure 8A:
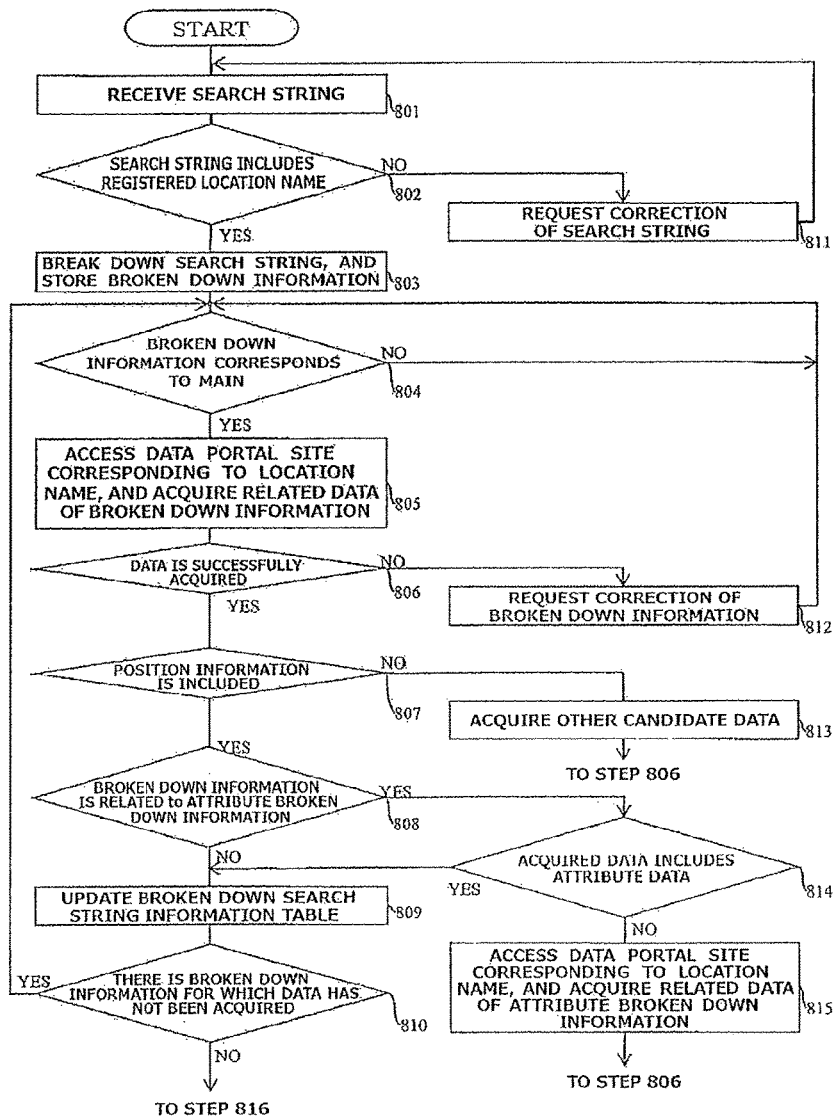
FIG. 8A is a flowchart illustrating an example of apart of data processing configuration establishing processing executed by a data processing server 101 according to the first embodiment of the present invention.
Figure 8B:
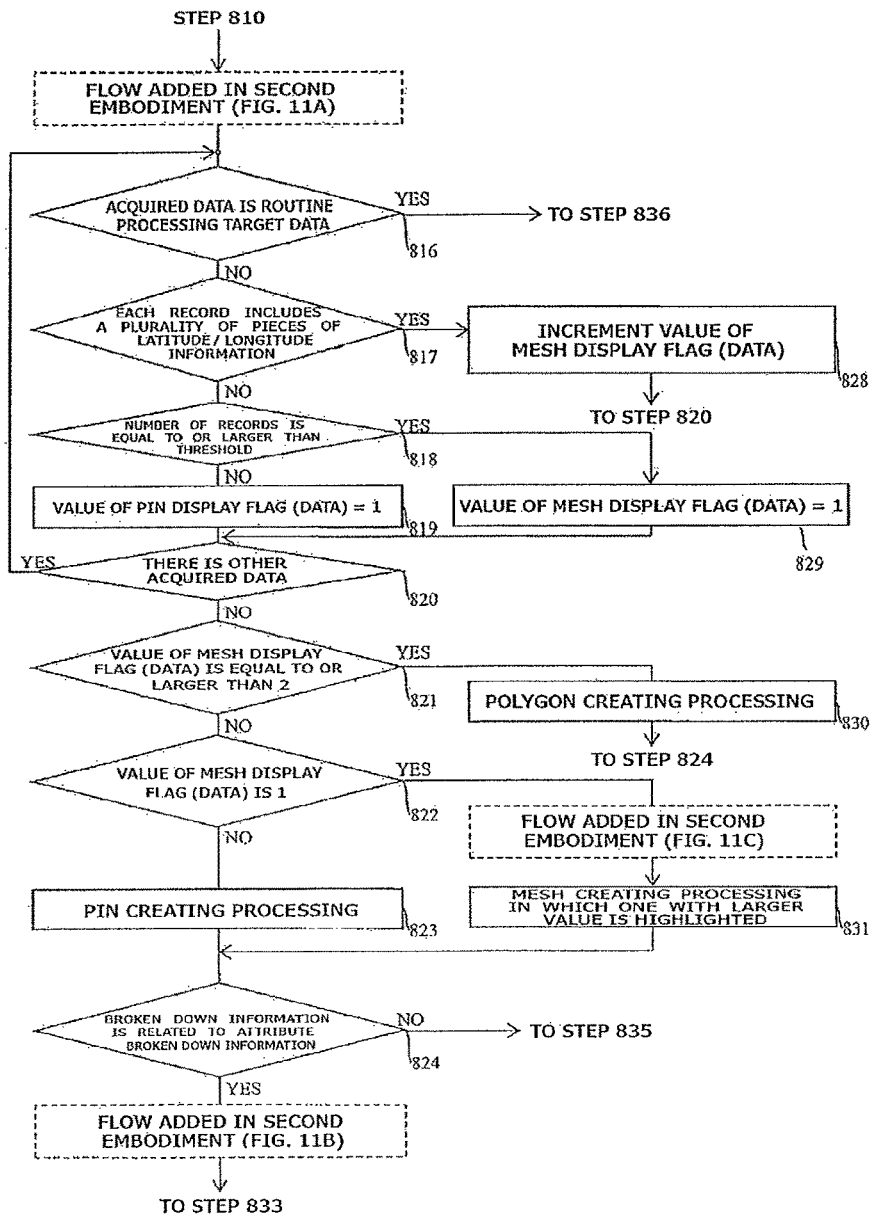
FIG. 8B is a flowchart illustrating an example of a part of the data processing configuration establishing processing executed by the data processing server 101 according to the first embodiment of the present invention.
Figure 8C:
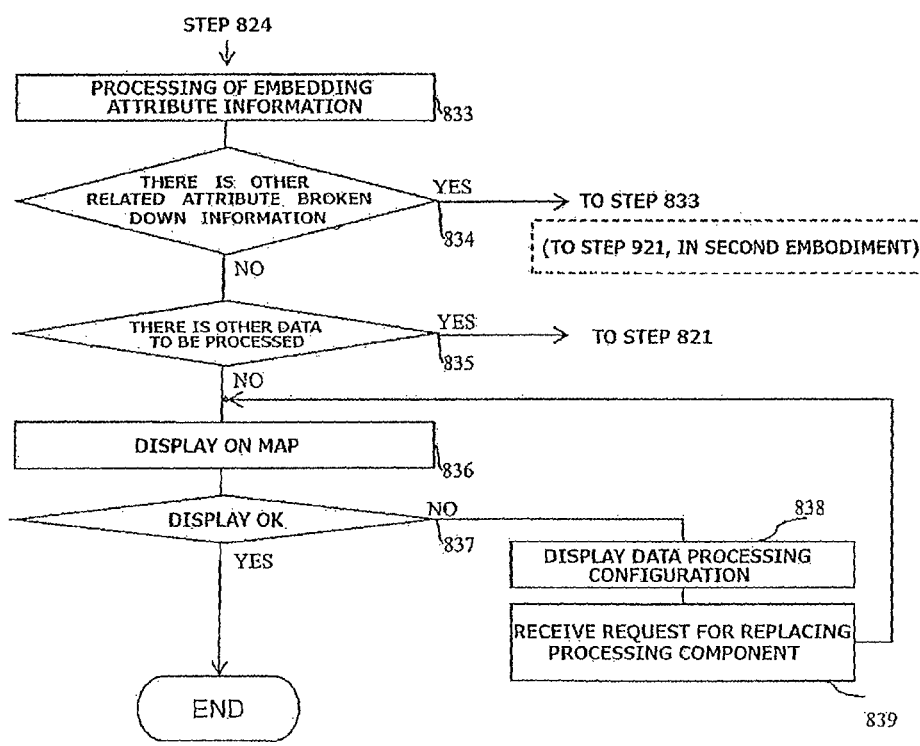
FIG. 8C is a flowchart illustrating an example of a part of the data processing configuration establishing processing executed by the data processing server 101 according to the first embodiment of the present invention.

FIGS. 8A to 8C are flowcharts illustrating an example of the data processing configuration establishing processing, executed by the data processing server 101, according to the first embodiment of the present invention. The user inputs information he or she wants to know in a form of search string through the client terminal 121, and the data processing server 101 receives the search string (step 801). For example, the client terminal 121 transmits to the data processing server 101, a search string, such as "Yokohama city, traffic accident and elementary school", and a request for executing the data processing configuration establishing processing, input from the user. The data processing server 101 receives the request, analyzes the received search string, and determines whether the received search string includes registered location information (step 802), by using the information in the item 203 in FIG. 3. For example, in the example described above, the location information "Yokohama city" has been registered in the item 203, and thus the data processing server 101 determines that the search string includes the registered location information. When it is determined in step 802 that the registered location information is not included, the data processing server 101 transmits a search string correction request to the client terminal 121 (step 811). When it is determined in step 802 that the registered location information is included, the client terminal 121 analyzes the received search string, breaks down the search string into units such as a noun, and stores the analysis result (step 803). For example, in the example described above, the client terminal 121 breaks the search string "traffic accident and elementary school" down into "traffic accident and" and "elementary school". This is performed with an algorithm such as a morphology analysis based on a dependency relation of a postpositional particle and the like. An optional configuration where the user breaks down the search string and sets resultant information, instead of the data processing server 101, may be employed. Whether one broken down search string information is attribute information of another broken down search string information can be determined from a possessive relation indicated by "of" or a dependency relation indicated by "having" or "with" in the search string, for example. Furthermore, an optional configuration where the user sets the attribute information instead of the search string analysis unit 106 as described above or corrects the determination result obtained by the search string analysis unit 106 in the manual mode may be employed.

Next, the data processing server 101 determines whether information obtained by breaking down the search string is the main information (step 804), when the information is not the main information, the processing returns to step 804 so that the same determination is performed on another broken down search string information. The main information is information with "main" in the item 302. Information that is not the main information and thus is attribute information, is information with "attribute" in the item 302. The attribute information is related to one main information which can be determined based on the information in the item 308. More specifically, the attribute information is related to broken down search string information including its attribute information thereof (attribute broken down search string information) in the item 308. Whether data for the broken down search string information 401 has been acquired can be determined by checking whether a file name is registered in the item 303. When it is determined instep 804 that information corresponds to the main information, the data processing server 101 accesses the data portal site 131, corresponding to the location information identified in step 802, and acquires data related to the broken down search string information (step 805). In step 805, the data processing server 101 determines whether there is related data in the data portal site as the access destination (step 806). When there is no such data, the data processing server 101 issues a request to correct the broken down search string information to the user (step 812). For example, whether there is the related data in the data portal site can be determined by inputting the broken down search string information through a search function provided by the data portal site, and checking whether there is at least one hit. When there are more than one hits, the most relevant data, the newest data, or the like may be acquired.

When the related data is found and successfully acquired in step 806, the data processing server 101 determines whether the data acquired includes position information in a format that can be processed (step 807). This determination can be made with data formats that can be processed defined in advance in the data processing server 101. Whether the position information is included can be determined by checking the data content and determining whether information indicating a position such as latitude, longitude, and the like is included. When the data acquired fails to satisfy the condition in step 807, the data processing server 101 acquires another one of a plurality of data candidates (step 813), obtained as a result of the searching in step 805, and the processing proceeds to step 806. When the data acquired satisfies the condition in step 807, the data processing server 101 determines whether the broken down search string information, used when the data is acquired, is related to another attribute broken down search string information (step 808). This determination can be made based on the broken down search string information table 113. For example, in the table 310 in FIG. 3, the item 302 indicates that the broken down search string information is main information that can exist independently from any other information and is not attribute information, and the item 308 indicates that no related attribute information is registered and thus the broken down search string information is related to no attribute broken down search string information. On the other hand, in the table 320, one broken down search string information "elementary school" has the value "1", indicating the related attribute, registered in the item 308. Thus, it can be recognized that "elementary school" is related to the broken down search string information "high-ranking" that is an attribute with the value "1" in the attribute ID 307.

When it is determined in step 808 that there is the related attribute broken down search string information, the data processing server 101 determines whether the data acquired includes data corresponding to the attribute. For example, in the example described above, whether the data acquired includes data "ranking" is determined (step 814). This determination can be made by checking the content of the data acquired to see whether there is a column name or a term "ranking", for example. When it is determined in step 808 that there is no related attribute broken down search string information or when the data corresponding to the attribute is found in step 814, the data processing server 101 updates the broken down search string information table 113 (step 809). For example, the table is updated as described above by registering, for each broken down search string information, the file name of the data, acquired as the related data, in the item 303, registering a value, in the attribute ID 307, in the item 308 when there is the related attribute broken down search string information 301, and performing the other like processing, in FIG. 3.

When no data corresponding to the attribute is found in step 814, the data processing server 101 accesses the data portal site corresponding to the location information, identified in step 802, and acquires the related data by using the attribute broken down search string information as in step 805 (step 815), and the processing proceeds to step 806. After step 809, whether there is the main broken down search string information 301 for which the related data has not been acquired is determined (step 810). The processing proceeds to step 804 when there is such main broken down search string information 301, and proceeds to step 816 when there is no such main broken down search string information 301.

The processing in steps 801 to 815 described above is described by using two specific search strings as examples. A first example of the search string is "Yokohama city, traffic accident and elementary school". The search string is broken down as illustrated in the table 310 through the processing in steps 801 to 803. The data processing server 101 determines that all the broken down search string information is the main information, and the processing proceeds from step 804 to step 805 where the data processing server 101 acquires data from the data portal site. The first broken down search string information is "traffic accident and", and thus the data processing server 101 acquires data including the information on the name of the traffic accident, the latitude/ longitude, and the like. As described above, the broken down search string information described above is related to no attribute broken down search string information, and thus the processing proceeds to step 809 where the data processing server 101 stores the data and performs registration in the table 310. In step 810, it is determined that the data has not been acquired for another broken down search string information "elementary school", whereby the processing returns to step 804 where the data processing server 101 similarly acquires the data. For example, the data processing server 101 acquires data including information on the name, latitude/longitude, and the like of an elementary school. Through the processing described above, the data is acquired for all the broken down search string information, whereby the processing proceeds from step 810 to step 816.

Next, processing executed for "Yokohama city, high-ranking elementary school", as a second example of the search string, will be described. The search string is broken down as illustrated in the table 320 through the processing in steps 801 to 803. From the information in the item 302, the data processing server 101 determines that the broken down search string information "high-ranking" is the attribute broken down search string information, and that "elementary school" is the main information related to the attribute, from the information in the item 308. The data processing server 101 performs the determination in step 804 on the first broken down search string information "high-ranking". This information is the attribute information, and thus the data processing server 101 executes no processing thereon, and the processing returns to step 804 where the data processing server 101 performs the determination again on another broken down search string information "elementary school". Because the "elementary school" is the main information, the processing proceeds to step 805 where the data processing server 101 acquires the data from the data portal site. For example, the data processing server 101 acquires the data such as csv file including information on the name, latitude/longitude, and the like of the elementary school. When the data processing server 101 successfully acquires the data, the processing proceeds to step 808. In step 808, the data processing server 101 recognizes that "elementary school" is related to the attribute broken down search string information ("high-ranking") from the information in the items 307 and 308, and the processing proceeds to step 814.

In step 814, the data processing server 101 determines whether the data acquired as described above includes data corresponding to the attribute broken down search string information. For example, when the data, related to "elementary school" acquired in step 805 described above, is the csv file, the data processing server 101 determines whether the csv file includes a column or a term "ranking". In this example, it is assumed that the data corresponding to the attribute broken down search string information is included, and the processing proceeds to step 809 where the data processing server 101 updates the broken down search string information table. More specifically, the data processing server 101 updates the values of the items 303 and 304. In this example, the attribute broken down search string information includes the acquired data related to the main information, and thus the same file name as the main information is in the item 303. The information on the column "ranking" in the file is used, and thus the data processing server 101 registers "ranking" in the item 304. On the other hand, when it is determined in step 814 that the acquired data includes no data corresponding to the attribute broken down search string information, the processing proceeds to step 815 where the data processing server 101 acquires data from the data portal site for the broken down search string information "high-ranking", as in step 805. The processing in steps 801 to 815 is described above by using the specific search strings as examples.

In step 816, the data processing server 101 determines whether the acquired data is data as a routine processing target (step 816), based on the routine processing file identifying information 115. For example, when the acquired data is the shapefile in FIG. 5, the data processing server 101 determines to execute the conversion processing to obtain the kmlfile. When it is determined in step 816 that the acquired data is the routine processing target, the processing proceeds to step 836, and when it is determined in step 816 that the acquired data is not the routine processing target, the data processing server 101 determines whether each of the records, configuring the data, includes a plurality of pieces of latitude/longitude information (step 817). For example, in the data, such as the csv file including a plurality of records each corresponding to a single line, when one record includes data such as (35.0,147.0), the data processing server 101 determines that acquired data includes one latitude/longitude information, and when the record includes data such as (35.0,147.0), (35.1,147.0), (35.0,147.1), and (35.1,147.1), the data processing server 101 determines that acquired data includes four pieces of latitude/longitude information. When the acquired data includes a plurality of pieces of latitude/longitude information, the data processing server 101 increments a value of the mesh display flag (data) (step 828). The data processing server 101 sets a value corresponding to the number of pieces of latitude/longitude information as the value of the mesh display flag (data), for example, the data processing server 101 sets "2" as the value of the mesh display flag (data) when the acquired data include two pieces of latitude/longitude information, and sets "4" as the value of the mesh display flag (data) when the acquired data includes four pieces of latitude/longitude information.

When it is determined in step 817 that the acquired data does not include a plurality of pieces of latitude/longitude information, the data processing server 101 determines whether the number of records in the data is equal to or larger than a threshold (step 818). The records that are equal to or larger than a threshold leads to a low visibility of the pin display, and thus the data processing server 101 sets "1" as the value of the mesh display flag (data) (step 829). When the number of records is smaller than the threshold, the data processing server 101 sets "1" as the value of the pin display flag (data) (step 819). A default value (100 and the like) is set, in the data processing server 101 in advance, as the threshold used by the data processing server 101 for the determination. After step 819 or 829, the data processing server 101 determines whether there is any other acquired data related to the broken down search string information (step 820). When there is such data, the processing proceeds to step 816, where the processing is similarly executed on the other acquired data.

When it is determined in step 820 that there is no other acquired data, the processing proceeds to step 821. Through the processing described above, the data processing server 101 determines processing that needs to be executed on the acquired data related to each broken down search string information, and stores the determination result as the flag information. Thereafter, the data processing server 101 executes the required processing on each acquired data, based on the determination result.

The data processing server 101 determines whether the value of the mesh display flag (data) of each broken down search string information is equal to or larger than 2 (step 821). When the value is equal to or larger than 2, the data processing server 101 executes polygon creating processing (step 830), and the processing proceeds to step 824. The polygon creating processing is processing of creating graphics such as a line and a rectangle. For example, the processing is executed in such a manner that when the value of the mesh display flag (data) is "2", a line connecting between two points of latitude/longitude information is created, and when the value is 4, a rectangle, obtained by connecting among four points of latitude/longitude information, is generated. To execute the processing, the data processing server 101 internally arranges a data processing component (a processing component with a value 005 as the processing component ID 602 in FIG. 6), corresponding to the polygon creating processing, as one component in the data processing configuration. When the condition in step 821 is not satisfied, the data processing server 101 determines whether the value of the mesh display flag (data) is 1 (step 822). When the value of the mesh display flag (data) is "1", the data processing server 101 executes mesh creating processing in which one with a large value (step 831) is highlighted, and the processing proceeds to step 824. The mesh creating processing is processing of portioning a map into small sections in a form of fine mesh, and counting data in each section. For example, when the acquired data is the data on the traffic accident, the number of traffic accidents in each section is counted. The section with a larger value is highlighted with a section having a large value, counted for each section, provided with a deeper color, and a section with a smaller value is provided with a lighter color, so that the section with a larger value is more highlighted to be displayed. To execute this processing, the data processing server 101 internally arranges each of data processing components (processing components respectively having 003 and 004 as the processing component ID 602 in FIG. 6), corresponding to the mesh creating processing and the processing of highlighting one with a larger value to be displayed, as one component in the data processing configuration.

When the condition in step 822 is not satisfied, the data processing server 101 executes pin creating processing (step 823). The pin creating processing is processing of putting a pin on a map. To execute this processing, the data processing server 101 internally arranges a data processing component (a processing component with a value 002 as the processing component ID 602 in FIG. 6), corresponding to the pin creating processing, as one component in the data processing configuration. After step 823 or 831, the data processing server 101 determines whether the broken down search string information on which the determination in step 821 is performed is related to another attribute broken down search string information (step 824). The determination can be made by checking whether a value is registered in the item 308.

When it is determined in step 824 that the broken down search string information is related to no other attribute broken down search string information, the processing proceeds to step 835. On the other hand, when there is related attribute broken down search string information, the data processing server 101 executes processing of embedding the related attribute information (step 833). The processing of embedding attribute information is executed as follows. For example, in the table 320, the broken down search string information "elementary school" is related to the attribute broken down search string information "high-ranking". Thus, the attribute information, that is, information with a column name "ranking" of the file b1.csv in the example illustrated in the table 320, is displayed as the attribute information related to each elementary school. More specifically, the data processing server 101 executes processing of displaying these pieces of information in a form of text alongside with the pin indicating the elementary school, or processing of displaying a balloon including these pieces of information when the pin indicating the elementary school is clicked. The method of embedding and displaying attribute information may include a processing method other than those described above. To execute the processing, the data processing server 101 internally arranges a data processing component (a processing component with a value 008 as the processing component ID 602 in FIG. 6), corresponding to the processing of embedding attribute information, as one component in the data processing configuration. After step 833, the data processing server 101 determines whether there is another related attribute broken down search string information (step 834). When there is such attribute broken down search string information, the processing proceeds to step 833. When there is no such attribute broken down search string information, the data processing server 101 determines whether there is any other data to be processed (step 835). The data processing server 101 executes the following specific processing to determine whether there is any other data to be processed. For example, the data processing server 101 refers to pieces of data in the table 310, one by one from the uppermost one to the lower most one, and executes processing in steps 821 to 834 first on the broken down search string information "traffic accident", and then on the broken down search string information "elementary school". The determination is made with such processing repeated until the final broken down search string information is processed.

When it is determined in step 835 that there is another data to be processed, the processing proceeds to step 821. When it is determined that there is no other data to be processed, the data processing server 101 collectively displays the processing results, obtained up until then, on the map (step 836). Map data is stored in a storage device of the data processing server 101. The CPU 103 loads the map data, stored in the storage device, onto the memory 102, and the information on the traffic accident and the elementary school is displayed on the map in the example described above. To execute the processing, the data processing server 101 internally arranges a data processing component (a processing components with a value 007 as the processing component ID 602 in FIG. 6), corresponding to the processing of displaying information on a map, as one component in the data processing configuration, and combines the processing component with the processing component internally created through the processing up to step 836, such as that corresponding to the pin creating processing in step 823, for example. After step 836, the data processing server 101 inquires the user whether the display content is appropriate through the client terminal 121 (step 837), and the processing is terminated when a response indicating that the display content is appropriate is received.

On the other hand, when a request to correct the display content is received from the user in step 837, the data processing server 101 provides the data processing configuration, used for the displaying, to the user through the client terminal 121 (step 838) and receives a request for correcting the data processing configuration, involving replacement of some of the processing components and the like (step 839). Then, the processing proceeds to step 836. The data processing configuration is obtained by combining one or more data processing components to execute desired processing as illustrated FIG. 7A. For example, when it is determined that, as a result of executing the processing in steps 801 to 836 on the broken down search string information "traffic accident and", "elementary school" in the example described above, the mesh processing, in which one with a larger value is displayed while being highlighted, is executed for "traffic accident and" and the pin creating processing is executed for "elementary school", the data processing configuration 720 in FIG. 7 is established and stored as the data processing configuration information 117 in the data processing server 101.

The processing in steps 816 to 836, in the processing described above, is described by using the two specific search strings as examples. The first example of the search string is "Yokohama city, traffic accident and elementary school". Pieces of data acquired in the processing executed up to step 815 for the "traffic accident and" and "elementary school" as the two pieces of broken down search string information, are "a1.csv" and "a2.csv" none of which is the routine processing target file. Furthermore, each record does not include the plurality of pieces of latitude/longitude information. Thus, in the processing executed up to step 820, the pin (data) flag is set to 1 for each broken down search string information as in the table 410. In steps 821 and 822, the mesh display flag is not set, and thus the processing proceeds to step 823 where the data processing server 101 executes the pin creating processing. In step 824, it is determined that each broken down search string information is related to no attribute information, whereby the processing proceeds to step 835. Because there is no other data to be processed, the processing proceeds to step 836 where the data processing server 101 displays the information on the traffic accident and the information on the elementary school, in the pin format, on the map.

Next, the processing executed on "Yokohama city, high-ranking elementary school" as the second example of the search string will be described. In this example, "high-ranking" is attribute information of "elementary school", and the file related to the "elementary school" is acquired from the data portal site through the processing up to step 815. The data associated with "high-ranking" is set as data corresponding to a single column included in the acquired file. As in the case of the first example of the search string, the acquired file is not the routine processing target file, and the plurality of pieces of latitude/longitude information are not included. Thus, the data processing server 101 sets "1" as the value of the pin (data) flag for the broken down search string information "elementary school", in the processing up to step 820. In steps 821 and 822, the mesh display flag is not set, and thus the processing proceeds to step 823 where the data processing server 101 executes the pin creating processing. In step 824, it is determined that the broken down search string information "elementary school" is related to the attribute information ("high-ranking"), and the processing proceeds to step 833, where the processing of embedding the attribute information is executed. In this example, the data processing server 101 executes processing of displaying information on a column name "ranking" of b1.csv, illustrated in the table 320, as the attribute information related to each elementary school. Specifically, the data processing server 101 executes the processing of displaying these pieces of information in a form of text alongside with the pin indicating the elementary school, or displaying a balloon including these pieces of information when the pin indicating the elementary school is clicked. Because there is no other related data or other data to be processed in steps 834 and 835, the processing proceeds to step 836 where the data processing server 101 displays the information on the elementary school, in a pin format, and ranking information of each elementary school, in a form of text, alongside with the pin indicating each elementary school, on the map.

The first embodiment of the present invention is as described above.

[Second Embodiment]

In the first embodiment, for displaying the data on the map, required processing is determined and the data processing configuration for executing the processing is established, based on a content of the acquired data. In the present embodiment, the data processing server 101 determines the required processing and establishes the data processing configuration not only based on the content of the data but also based on the content of the search string received from the client terminal 121. In the present embodiment, a portion different from the first embodiment will be described. First of all, a portion of the hardware configuration and the software configuration of the data processing system different from the first embodiment will be described.

Figure 9:
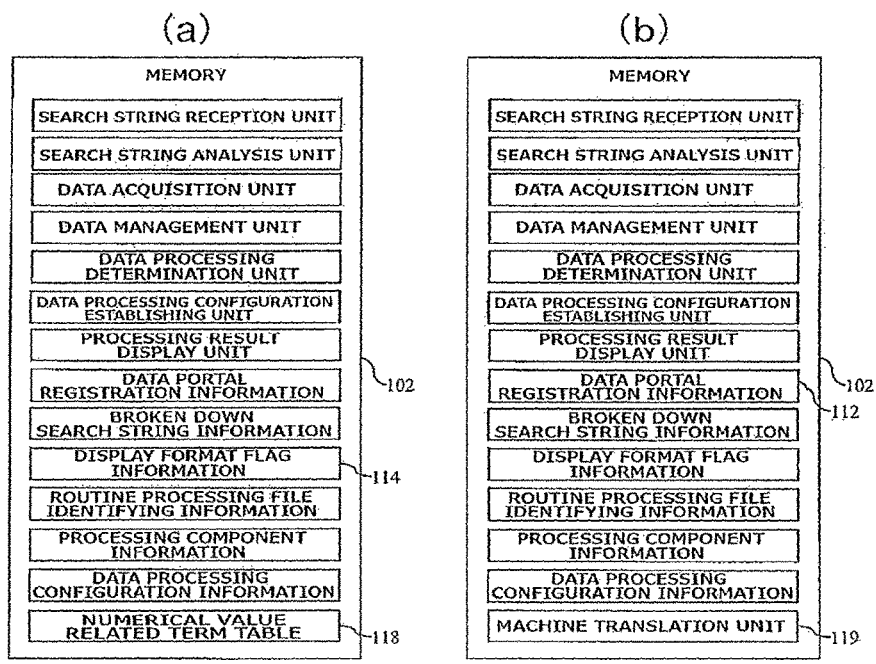
FIG. 9 is a block diagram illustrating an example of a memory configuration of a data processing server according to the second embodiment and a third embodiment of the present invention.

FIG. 9 is a block diagram illustrating the software configuration of the data processing system according to the second embodiment of the present invention. The memory 102, including the information described in the first embodiment, is further provided with a numerical value related term table 118. The display format flag information 114 also has a content partially changed from that in the first embodiment. The numerical value related term table 118 is used for determining whether the search string, received from the client terminal 121, includes a term related to a numerical value such as a large number of/a small number of, and the like, for example.

FIG. 10 is a diagram illustrating an example of the numerical value related term table 118 according to the second embodiment of the present invention. The numerical value related term table 118 includes two data items that are items 1001 and 1002. The item 1001 indicates the name of a term registered as the numerical value related term. The numerical value related term includes a term such as "population density" indicating a density, and a term such as "birth rate" indicating a rate. Such terms include default terms initially registered. Furthermore, the user can add terms as appropriate. The item 1002 is flag information indicating whether the term in the item 1001 represents a magnitude. For example, terms such as "large" and "large number of" in the item 1001 are terms representing a large magnitude, and correspond to a value "1" set in the item 1002 therefor. On the other hand, terms such as "small" and "small number of" in the item 1001 are terms representing a small magnitude, and corresponds to a value "2" set in the item 1002. A term such as "population density" in the item 1001 is not a term that directly indicate a magnitude, and corresponds to a value "0" set in the item 1002.

Next, a portion of the information in the display format flag information 114 different from the first embodiment will be described. As illustrated in FIG. 4B, information in items 404 to 406 is added. The item 404 is flag information indicating a result of determining whether to display the information in the item 401 in the pin format, determined from the content of the search string received from the client terminal 121. For example, the information with the value "1" in the item 404 is determined to be displayed in the pin format. The item 405 is flag information indicating a result of determining whether the information in the item 401 is displayed in the mesh format, from the content of the search string received from the client terminal 121. For example, the information with the value "1" in the item 405 is determined to be displayed in the mesh format in which one with a larger value is displayed while being highlighted. When the information is displayed in the mesh format in which one with a larger value is highlighted, as described above for step 831, the acquired data is displayed in a mesh format in which one with a larger value is more highlighted with a deeper color or the like.

On the other hand, when the value of the item 405 is "2" as in the table 440, the acquired data is displayed in the mesh format, in which one with a smaller value is displayed while being highlighted. When the value of the item 405 is "0" as in the table 430, the acquired data is displayed in the mesh format, in which data is displayed while being highlighted in accordance with a default setting in the data processing server 101. For example, the data processing server 101 is provided with the default setting used for displaying the acquired data in the mesh format, and when the default setting is set with which the acquired data is displayed in the mesh format in which one with a larger value is displayed while being highlighted, the acquired data is displayed in the mesh format in which one with a larger value is displayed while being highlighted as in the case where the value of the item 405 is "1". The item 406 is flag information indicating a result of determining whether the information in the item 401 is displayed in the pin format as the attribute information of the other broken down search string information 401, from the content of the search string received from the client terminal 121. For example, when the value of the item 406 is "1" as in the table 420, the information is displayed in the pin format, and a pin corresponding to the attribute information of a larger value is displayed while being highlighted, with a deeper color or the like. For example, the search string "high-ranking elementary school" is broken down into the broken down search string information "elementary school" and the broken down search string information "high-ranking" as the attribute information of "elementary school". Then, for the broken down search string information "elementary school", data related to an elementary school is acquired. When the acquired data includes information on the ranking, the ranking information on each elementary school is displayed in the pin format as the attribute information with the one with a higher ranking displayed with a deeper color. On the other hand, when the value of the item 406 is "2", the acquired data is displayed in the pin format in which one corresponding to the attribute information with a smaller value is displayed while being highlighted with a deeper color and the like.

The portion of the hardware and the software configurations of the data processing system according to the present embodiment different from the first embodiment is as described above.

Next, data processing configuration establishing processing according to the present embodiment will be described based on the hardware and the software configurations described above. A description on a portion that is the same as the first embodiment is omitted, and only a different portion will be described. In the present embodiment, processing in boxes with dotted lines in the flow of processing in the first embodiment illustrated in FIGS. 8B and 8C is added or corrected. The processing is described in detail below with reference to FIGS. 11A to 11C.

<Data Processing Configuration Establishing Processing According to Second Embodiment>

Figure 11A:
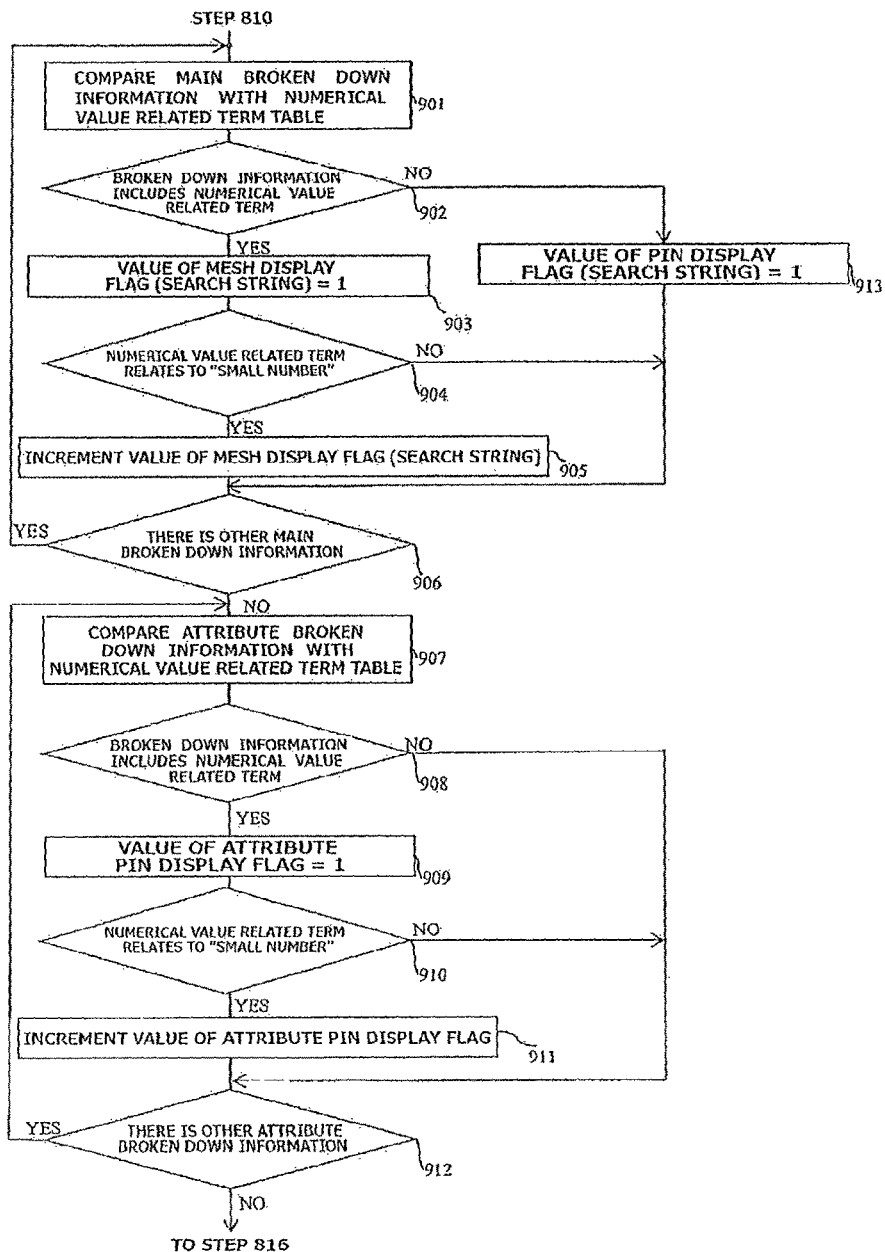
FIG. 11A is a flowchart illustrating an example of a part of data processing configuration establishing processing executed by the data processing server 101 according to the second embodiment of the present invention.
Figure 11B:
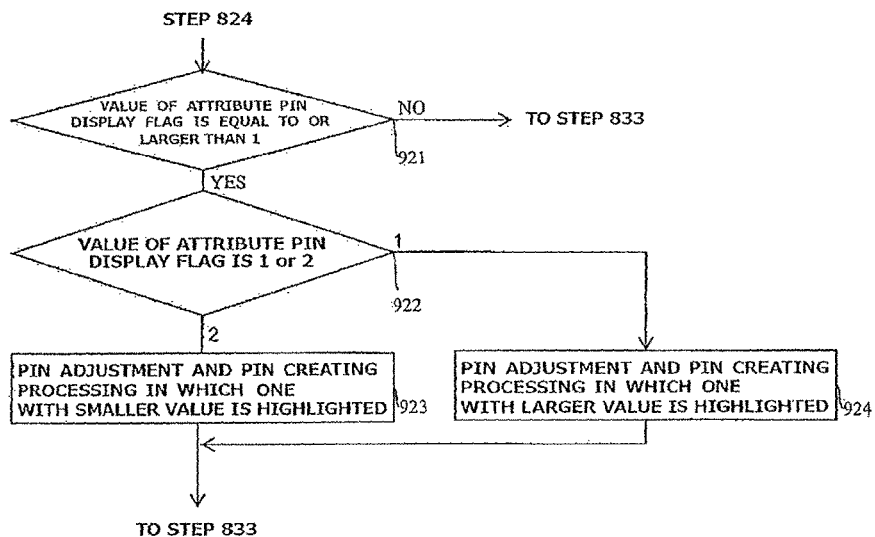
FIG. 11B is a flowchart illustrating an example of a part of the data processing configuration establishing processing executed by the data processing server 101 according to the second embodiment of the present invention.
Figure 11C:
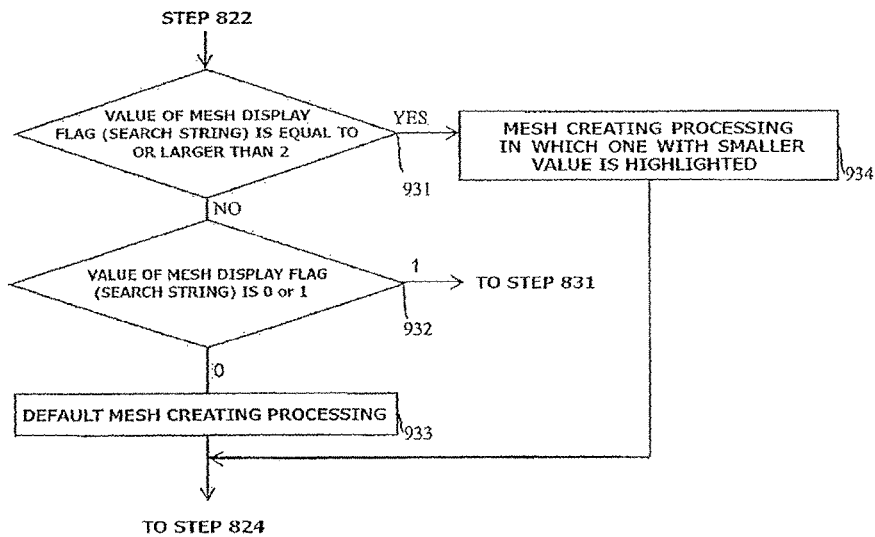
FIG. 11C is a flowchart illustrating an example of a part of the data processing configuration establishing processing executed by the data processing server 101 according to the second embodiment of the present invention.

FIG. 11A is a flowchart illustrating an example of a part of the data processing configuration establishing processing executed by the data processing server 101 according to the second embodiment of the present invention. When it is determined in step 810 that there is no broken down search string information 401 for which the data has not been acquired, the data processing server 101 compares the content of the main broken down search string information 401 with a value "main" in the item 302 with the numerical value related term table 118 (step 901). The data processing server 101 determines whether the broken down search string information 401, involved in the comparison, includes a term registered in the numerical value related term table 118 (step 902). When such a term is not included, the value "1" is set to the pin display flag (search string), that is, in the item 404 (step 913). When it is determined in step 902 that the numerical value related term is included, the data processing server 101 sets the value "1" to the mesh display flag (search string), that is, in the item 405 (step 903).

Next, the data processing server 101 determines whether the numerical value related term in the broken down search string information 401 is a term indicating a small amount (step 904). When the numerical value related term relates to such a term, the value of the mesh display flag (search string), that is, the item 405 is incremented to "2" (step 905). The processing proceeds to step 906 when the numerical value related term does not relate to such a term. Whether the numerical value related term relates to a small amount is determined based on the item 1002. More specifically, the data processing server 101 makes the determination based on whether the broken down search string information 401 includes a term with the value "2" as the value of the item 1002. Next, the data processing server 101 determines whether there is another main broken down search string information 401 (step 906). The processing proceeds to step 901 when there is such broken down search string information 401. When it is determined in step 906 that there is no such broken down search string information 401, the data processing server 101 executes similar processing on the attribute broken down search string information 401. More specifically, the data processing server 101 compares the content of the attribute broken down search string information 401 with the content of the numerical value related term table 118 (step 907). The data processing server 101 determines whether the broken down search string information 401, involved in the comparison, includes a term registered in the numerical value related term table 118 (step 908). The processing proceeds to step 912 when the term is not included. When it is determined in step 908 that the numerical value related term is included, the data processing server 101 sets the value "1" to the attribute pin display flag, that is, in the item 406 (step 909).

Next, the data processing server 101 determines whether the numerical value related term, in the broken down search string information 401, relates to a term indicating a small amount (step 910). When the numerical value related term is such a term, the data processing server 101 increments the value of the attribute pin display flag, that is, the value of the item 406 to "2" (step 911). The processing proceeds to step 912 when the numerical value related term is not such a term. Next, the data processing server 101 determines whether there is another attribute broken down search string information 401 (step 906). The processing proceeds to step 907 when there is such information, and proceeds to step 816 descried in the first embodiment when there is no such information.

One of the portions of the present embodiment different from the first embodiment, that is, one (upper one) of the three boxes with dotted lines in FIG. 8B is as described above. Next, a portion of the processing, corresponding to another one (lower one) of such boxes in FIG. 8B, different from the first embodiment will be described with reference to FIG. 11B.

After step 824, the data processing server 101 determines whether the value of the attribute pin display flag (item 406) of the broken down search string information 401 is equal to or larger than "1" (step 921). When the value is less than "1", the processing proceeds to step 833. When the value is equal to or larger than "1", the data processing server 101 determines whether the value of the attribute pin display flag (item 406) is "1" or is "2" (step 922). When it is determined in step 922 that the value is "2", the data processing server 101 executes pin adjustment and pin creating processing in which one with a smaller value is displayed while being highlighted (step 923). When it is determined in step 922 that the value of the pin display flag is "1", the data processing server 101 executes pin adjustment and pin creating processing in which one with a larger value is displayed while being highlighted (step 924). Then, the processing proceeds to step 833 described in the first embodiment. The pin adjustment is adjustment processing, executed for a plurality of pins put on the same position, so that an inclination of a pin is changed or a distance is provided between the pins, to prevent one of the pins from hiding another one of the pins. The adjustment is performed based on the value of the attribute ID (item 307). For example, a pin corresponding to the value "1" as the attribute ID is displayed while being inclined by 15°, and a pin corresponding to the value "2" as the attribute ID is displayed while being inclined by 30°. The pin creation in which one with a larger value is displayed while being highlighted corresponds to creation of pins with a pin corresponding to larger data displayed while being highlighted with a deeper color and the like.

On the other hand, the pin creation in which one with a smaller value is displayed while being highlighted corresponds to creation of pins with a pin corresponding to smaller data (such as ranking for example), as a target of displaying in the pin format, displayed while being highlighted with a deeper color and the like. To execute this processing, the data processing server 101 internally arranges each of data processing components (processing components with values 009 and 010 as the processing component ID 602 in FIG. 6), corresponding to the pin adjustment processing and the pin highlighted displaying processing, as one component in the data processing configuration. The processing components, each arranged as one component in the data processing configuration, are eventually combined with the data processing component corresponding to the processing of displaying information on a map arranged in the data processing server 101 in step 836.

The second different portion between the present embodiment and the first embodiment in the flow of processing has been described above. Next, a portion of the processing, corresponding to remaining one (middle one) of such boxes in FIG. 8B, different from the first embodiment will be described with reference to FIG. 11C.

After step 822, the data processing server 101 determines whether the value of the mesh display flag (item 405) is equal to or larger than "2" for the broken down search string information 401 (step 931). When the value is equal to or larger than "2", mesh creating processing to display one with a smaller value while being highlighted is executed (step 934). When it is determined in step 931 that the value is smaller than 2, the data processing server 101 determines whether the value of the mesh display flag is "0" or is "1" (step 932). When the value is "1", the processing proceeds to step 831. When it is determined in step 932 that the value of the mesh display flag is "0", the data processing server 101 executes default mesh creating processing (step 933), and the processing proceeds to step 824. The default mesh creating processing corresponds to the displaying in the mesh format in which the highlighted displaying corresponds to the default setting in the data processing server 101. For example, the data processing server 101 is provided with the default setting used for displaying the acquired data in the mesh format, and when the default setting is set with which the acquired data is displayed in the mesh format in which one with a larger value is displayed while being highlighted, the data processing server 101 executes the mesh creating processing in which one with a larger value is displayed while being highlighted. On the other hand, when the default setting is set with which the acquired data is displayed in the mesh format in which one with a smaller value is displayed while being highlighted, the data processing server 101 executes the mesh creating processing in which one with a smaller value is displayed while being highlighted. To execute the processing, the data processing server 101 internally arranges each of data processing components (processing components with the values 602 and 003 as the processing component ID in FIG. 6), corresponding to the default mesh creating processing and the mesh creating processing resulting in one with a smaller value displayed while being highlighted, as one component in the data processing configuration. The processing components, each arranged as one component in the data processing configuration, are eventually combined with the data processing component corresponding to the processing of displaying information on a map internally arranged in the data processing server 101 in step 836.

Finally, a fourth portion different from the first embodiment, that is, a portion with dotted lines in FIG. 8C will be described. In the present embodiment, the processing proceeds to step 921 when the condition is satisfied in step 834.

A description is given below assuming that processing according to the present embodiment described above is an example of processing generated as a result of determining the contents of the specific search strings illustrated in the tables 420 and 440 as examples and the content of the data, and that the same flag values are set. Furthermore, it is assumed that the data related to each broken down search string information has been acquired in the processing up to step 810 in the first embodiment. The first example of the search string is "Yokohama city, high-ranking elementary school". It is determined in step 901, the main broken down search string information "elementary school" includes no numerical value related term. Thus, the processing proceeds to step 913 where the data processing server 101 sets the pin display flag (search string) as illustrated in the item 404. It is determined in step 906 that there is no other main broken down search string information. Thus, the processing proceeds to step 907 where the data processing server 101 compares "high-ranking" that is the attribute broken down search string information with the numerical value related term table. Because the attribute broken down search string information includes "high" that is the numerical value related term, the attribute pin display flag is set as illustrated in the item 406 in steps 908 and 909. It is determined in step 910 that the numerical value related term is not related to "small amount", and thus the processing proceeds to step 912. Because there is no other attribute broken down search string information, the processing proceeds to step 816. Through the processing in steps 816 to 820, the value "1" is set to the pin (data) flag in the item 402 as in the table 420, for the broken down search string information "elementary school" as in the first embodiment. After step 824, it is determined in step 921 that the value of the pin display flag for the attribute "high-ranking" is "1". Thus, the processing proceeds to step 922 and then to step 924 where the pin creating processing is executed in which the pin corresponding to "elementary school" with higher ranking data is displayed while being highlighted with a deeper color and the like. Then, the data processing server 101 executes the processing in steps 833 to 836 as in the first embodiment, so that the information on an elementary school is displayed in the pin format, on a map, with a pin corresponding to the elementary school with higher ranking data provided with a deeper color.

Next, "Yokohama city, elementary school with few crimes" is described as a second example of the search string. This example includes no attribute broken down search string information, and only includes the main broken down search string information. For "elementary school", the processing proceeds from step 901 to step 902 and to step 913 where the pin display flag (search string) is set to "1", as in the first example of the search string. For "with few crimes", the processing proceeds to step 902 and to step 903, where the data processing server 101 sets "1" as the value of the mesh display flag (search string). Then, it is determined in step 904 that the information corresponds to the term relates to "small amount". Thus, the value of the mesh display flag (search string) is incremented to "2". Since no attribute broken down search string information is included, the processing proceeds to step 912 and to step 816. Then, the data processing server 101 sets "1" as the value of the pin (data) flag in the item 402 for the broken down search string information "elementary school" through the processing in steps 816 to 820 as in the first embodiment, and sets "1" as the value of the mesh (data) flag for the broken down search string information "with few crimes" as in the table 440. Then, the processing proceeds to step 822, to step 931, and then to step 934 where the data processing server 101 executes, for "with few crimes", the mesh creating processing in which one with a smaller number of crimes is displayed while being highlighted. Then, the processing proceeds to step 824. It is determined in step 824 that there is no related attribute broken down search string information, and the processing proceeds to step 835. Because there is no other data to be processed, the processing proceeds to step 836, and the information on the elementary school is displayed in the pin format on a map, whereas the information on crimes is displayed in the mesh format in which one with a smaller number of crimes is displayed while being highlighted.

The second embodiment of the present invention is as described above. In the first and the second embodiments, processing starts with data acquisition and ends with the data processing configuration established. When the same processing is frequently executed, there might be a case where the data processing configuration is patterned and is thus fixed as illustrated in FIG. 7A, so that the data processing configuration needs not to be established from the beginning. In such a case, the required data is searched and acquired through the processing up to step 810, and the processing may be executed with the data thus acquired input to the data processing configuration that has been established.

[Third Embodiment]

In the first and the second embodiments, the data processing server 101 accesses a data portal site in Japanese, and acquires data. In the present embodiment, the data processing server 101 accesses a data portal site in English and acquires data, based on a search string from the client terminal 121, and the data is processed to be displayed on a map.

FIG. 9B is a block diagram illustrating a software configuration of a data processing system according to a third embodiment of the present invention. The memory 102 includes the information described in the first embodiment, and is additionally provided with a machine translation unit 119. The data portal registration information 112 is also additionally provided with language information as the item 204. Thus, the language information for each data portal site is stored. The machine translation unit 119 converts a search string received from the client terminal 121 in accordance with a language used in each data portal site as an access destination, searches for and acquires data by using the converted search string.

The present embodiment is different from the first and the second embodiments in the data access processing, that is, the processing in steps 805 and 815. The difference is described in detail below.

The data processing server 101 that has received a search string from the client terminal 121 breaks down the search string into the broken down search string information 401, through the processing in steps 801 to 804. In step 805, when accessing a data portal site corresponding to the location name identified in step 802, the data processing server 101 determines the used language of the data portal site as the access destination based on the information in the item 204. The machine translation unit 119 translates each broken down search string information 401 into the used language thus determined, and searches for and acquires data, in the data portal site, by using the translated broken down search string information 401. For example, when the broken down search string information is "shougakkou (a Japanese word for elementary school)", and the language information of the access destination website is "EN" indicating English, "school", as a result of the translation, is input to a search form in the access destination website, to search for and acquire data. The translation of the broken down search string information 401 and the data search and acquisition are similarly performed in step 815. When the data is successfully acquired in step 806, the machine translation unit 119 translates a string such as the column name in the acquired data into Japanese, and the processing at and after step 807 is executed thereafter as in the first embodiment.

As described above, in the present embodiment, when accessing the data portal site 131 to acquire data, based on a search string received from the client terminal 121, the data processing server 101 can translate the search string into a used language of each data portal site 131 as the access destination to perform data search and acquisition, and translate the acquired data into an original language of the search string.

[Fourth Embodiment]

In the present embodiment, the data processing server 101 operates in cooperation with a search engine to retrieve data as a result of the search by the search engine, processes the data, and displays the resultant data on a map. Various search menus such as image search and news search in addition to normal web searching are currently provided in various search engines, and when a search menu such as an open data search menu is made available in the future, the data processing server 101 may retrieve and use data as a result of the search with the open data search menu. The processing executed after the data is acquired with a search engine is the same as those in the first and the second embodiments. Thus, processing up to the acquisition of the data is described in this embodiment. The data processing server 101 includes a search engine cooperation unit that calls a search engine and retrieves a result of the search by the search engine. The present embodiment is described in detail below.

A search string, input by the user, is transmitted to the data processing server 101 through the client terminal 121. As in the first and the second embodiments, the client terminal 121 transmits a request to establish the data processing configuration to the data processing server 101. The data processing server 101 obtains the broken down search string information 401 which is obtained by breaking down the search string through the processing up to step 804. Then, in step 805, the search engine cooperating unit of the data processing server 101 calls a search engine, and inputs each broken down search string information 401 described above to the search engine to perform related data search and acquisition. Then, through the processing at and after step 816, the acquired data is processed and displayed on a map. Here, calling the search engine to search for and acquire data may be implemented by incorporating an application programming interface (API) provided by the search engine into the data processing server 101, for example. Alternatively, when the search engine has a function with which a plurality of search strings (or pieces of broken down search string information 401 obtained by breaking down the search string in detail) can be input in parallel and the pieces of related data can be acquired in parallel, the plurality of search strings and the pieces of related data acquired may be transferred to the data processing server 101, and then the data processing server 101 may display information on a map through processing at and after step 803, with steps 805, 806, 812, and 815 skipped, based on the received data. Instead of providing the function of calling the search engine on a side of the data processing server 101, a function of calling the data processing server 101 may be provided on a side of the search engine, so that the search string and the data as the search result are transferred to the data processing server 101 so as to be processed.

As described above, in the present embodiment, the data processing server 101 operates in cooperation with a search engine, and thus can retrieve a result of the search by the search engine, process the data, and display the resultant data on a map.

The embodiments of the present invention are described above in detail. In the embodiments described above, a data processing server receives a search string, including a location name, from a client terminal, breaks down the received search string, acquires related data of each broken down information from a website such as a portal site, stores the each broken down information and the related data of the broken down information in a storage unit in association with each other, determines for each broken down information, whether a record of the related data of the broken down information includes a plurality of pieces of latitude/longitude information, sets a mesh display flag or a pin display flag to the broken down information in a storage unit or increments a value of the set mesh display flag based on a result of the determination, executes, on the related data of the broken down information, polygon display processing, mesh display processing, or pin display processing on a map, based on a value of the mesh display flag and a value of the pin display flag, and transmits a result of the processing to the client terminal as the source of the search string. Thus, even a user with limited knowledge and skill on data processing can easily process data acquired from a website such as a portal site. In the embodiments described above, the user only needs to set a search string for the information he or she wants to obtain, and the data processing server 101 operates on behalf of the user to execute the processing including: determining processing required for creating and displaying the information; and establishing the processing component configuration for implementing the processing. Thus, the user with limited knowledge and skill on data processing can easily perform data processing for displaying combined data, for example. A default processing component configuration, established by the data processing server 101, may be partially customized to be corrected to achieve processing desired by the user more easily.

It is a matter of course that the present invention is not limited to the embodiments described above, and can be implemented in various forms without departing from the gist of the present invention. For example, the data processing configuration establishing processing may be implemented in such a manner that, instead of establishing the data processing configuration from the beginning, the data processing configuration that has already been established is reused with the result of data search and acquisition by the data processing server 101 input to the data processing configuration that has already been established. The embodiments are described above in detail only to make the present invention more clearly understandable, and thus not all the described configurations need to be used. A configuration of one embodiment can be partially replaced with a configuration of another embodiment. Furthermore, a configuration of one embodiment can be added to a configuration of another embodiment. A configuration of each embodiment can be additionally provided with a different configuration, deleted, or replaced. The configurations, the functions, the processing units, and the like described above may partially or entirely be designed with an integrated circuit for example to be implemented with hardware.

What is claimed is:

1. A data retrieval method that improves visibility of returned results, the method comprising:
   receiving a search string including a location name from a client terminal in a first language;
   breaking down the search string into broken down information;
   translating the broken down information into a second language that is used in a website corresponding to the location name;
   acquiring related data of each broken down information from the website in the second language;
   translating the related data from the second language into the first language to form translated related data;
   storing the each broken down information and the translated related data in a storage unit in association with each other;
   determining, for each broken down information, whether a record of the related data of the broken down information includes a plurality of pieces of latitude/longitude information;
   on a condition that a number of the plurality of pieces of latitude/longitude information exceeds a threshold, setting a mesh display flag of the broken down information stored in the storage unit;
on the condition that the number of the plurality of pieces of latitude/longitude information does not exceed the threshold, setting a pin display flag of the broken down information stored in the storage unit;
executing, on the translated related data, polygon display processing, mesh display processing, or pin display processing on a map, based on a value of the mesh display flag and a value of the pin display flag; and
transmitting a result of the polygon display processing to the client terminal.

2. The method according to claim 1, wherein the website includes a data portal site corresponding to the location name.

3. A data retrieval system that improves visibility of returned results, the system comprising:
a memory;
a communication interface; and
a processor communicatively coupled to the memory and the communication interface, wherein the processing:
receives, using the communication interface, a search string including a location name from a client terminal in a first language;
breaks down the search string into broken down information;
translates the broken down information into a second language that is used in a website site corresponding to the location name;
acquires, using the communication interface, related data of each broken down information from the website in the second language;
translates the related data from the second language into the first language to form translated related data;
stores, in the memory, the each broken down information and the translated related data in association with each other;
determines, for each broken down information, whether a record of the related data of the broken down information includes a plurality of pieces of latitude/longitude information;
on a condition that a number of the plurality of pieces of latitude/longitude information exceeds a threshold, sets a mesh display flag of the broken down information stored in the memory;
on the condition that the number of the plurality of pieces of latitude/longitude information does not exceed the threshold, sets a pin display flag of the broken down information stored in the memory;

executes, on the translated related data, polygon display processing, mesh display processing, or pin display processing on a map, based on a value of the mesh display flag and a value of the pin display flag; and
transmits a result of the polygon display processing to the client terminal.

4. The system according to claim 3, wherein the website includes a data portal site corresponding to the location name.

5. A non-transitory computer readable storage medium storing instructions that when executed by a computer cause the computer to execute:
receiving a search string including a location name from a client terminal in a first language;
breaking down the search string into broken down information;
translating the broken down information into a second language that is used in a website corresponding to the location name;
acquiring related data of each broken down information from the website in the second language;
translating the related data from the second language into the first language to form translated related data;
storing the each broken down information and the translated related data in a storage unit in association with each other;
determining, for each broken down information, whether a record of the related data of the broken down information includes a plurality of pieces of latitude/longitude information;
on a condition that a number of the plurality of pieces of latitude/longitude information exceeds a threshold, setting a mesh display flag of the broken down information stored in the storage unit;
on the condition that the number of the plurality of pieces of latitude/longitude information does not exceed the threshold, setting a pin display flag of the broken down information stored in the storage unit;
executing, on the translated related data, polygon display processing, mesh display processing, or pin display processing on a map, based on a value of the mesh display flag and a value of the pin display flag; and
transmitting a result of the polygon display processing to the client terminal.

6. The non-transitory computer readable storage medium according to claim 5, wherein the website includes a data portal site corresponding to the location name.

* * * * *